United States Patent [19]

Ardini, Jr. et al.

[11] Patent Number: 4,761,755

[45] Date of Patent: Aug. 2, 1988

[54] DATA PROCESSING SYSTEM AND METHOD HAVING AN IMPROVED ARITHMETIC UNIT

[75] Inventors: Joseph L. Ardini, Jr., Needham; Robert F. Beckwith; Chi-Ping Chen, both of Framingham; Paul K. Rodman, Ashland, all of Mass.

[73] Assignee: Prime Computer, Inc., Natick, Mass.

[21] Appl. No.: 629,640

[22] Filed: Jul. 11, 1984

[51] Int. Cl.⁴ .............................................. G06F 7/38
[52] U.S. Cl. .................................... 364/749; 364/200
[58] Field of Search ................. 364/749, 200 MS File, 364/900 MS File

[56] References Cited

U.S. PATENT DOCUMENTS

| | | | |
|---|---|---|---|
| 3,980,992 | 8/1976 | Levy et al. | 340/172.5 |
| 4,071,890 | 1/1978 | Pandeya | 364/200 |
| 4,090,250 | 5/1978 | Carlson et al. | 364/900 |
| 4,109,310 | 8/1978 | England et al. | 364/200 |
| 4,128,873 | 12/1978 | Lamiaux | 364/200 |
| 4,144,563 | 3/1979 | Heuer et al. | 364/200 |
| 4,155,118 | 5/1979 | Lamiaux | 364/200 |
| 4,159,520 | 6/1979 | Prioste | 364/200 |
| 4,218,747 | 8/1980 | Miura | 364/716 |
| 4,224,676 | 9/1980 | Appelt | 364/712 |
| 4,237,532 | 12/1980 | Borgerson et al. | 364/200 |
| 4,300,195 | 11/1981 | Raghunathan et al. | 364/200 |
| 4,314,333 | 2/1982 | Shibayama et al. | 364/200 |
| 4,323,981 | 4/1982 | Nakamura | 364/749 |
| 4,370,709 | 1/1983 | Fosdick | 364/200 |
| 4,393,468 | 7/1983 | New | 364/736 |
| 4,430,711 | 2/1984 | Anderson et al. | 364/200 |
| 4,434,462 | 2/1984 | Guttag et al. | 364/200 |
| 4,441,154 | 4/1984 | McDonough et al. | 364/200 |
| 4,442,498 | 4/1984 | Rosen | 364/745 |
| 4,445,177 | 4/1984 | Bratt et al. | 364/200 |
| 4,502,115 | 2/1985 | Eguchi | 364/749 |
| 4,507,748 | 3/1985 | Cotton | 364/749 |
| 4,542,476 | 9/1985 | Nagafuji | 364/749 |

Primary Examiner—Gary V. Harkcom
Assistant Examiner—Dale M. Shaw
Attorney, Agent, or Firm—Lahive & Cockfield

[57] ABSTRACT

A data processing system, wherein the central processing unit has an arithmetic element for processing data in response to machine program instructions and a control store for microcode program storage responsive to the machine instructions for implementing the instruction, has an improved arithmetic unit for enabling higher throughput without substantially increasing hardware cost. The arithmetic unit has a reconfigurable arithmetic logic unit which is controlled in response to both hardware generated data signals and microcode generated data signals. A data string manipulation circuitry provides for aligning data strings for processing by the arithmetic logic unit. Circuitry is provided, responsive to a decoded machine instruction, for generating control signals for configuring the arithmetic unit and for controlling the data string manipulation circuitry. As a result, the number of microcode steps needed to implement particular decimal and string manipulation machine instructions is significantly reduced, thereby saving machine cycles, while the additional hardware cost is very modest.

9 Claims, 4 Drawing Sheets

DATA PROCESSING SYSTEM AND METHOD HAVING AN IMPROVED ARITHMETIC UNIT

BACKGROUND OF THE INVENTION

The invention relates generally to a data processing method and apparatus, and in particular to a method and apparatus for operating the arithmetic unit of a data processing system with greater throughput and flexibility.

Competing priorities provide a constant dilemma for the computer design engineer. On the one hand, the engineer designs and builds faster and more powerful data processing systems; while, on the other hand, there is a continuing effort to keep the manufacturing cost of the system as low as possible. One approach for controlling and reducing cost is to reduce the quantity of the hardware required to produce a desired result. It was in part that motivation that spurred the computer industry to develop computers using a microcode control store to execute a program instruction in a sequence of small steps as opposed to the relatively large and complex hardware oriented main frame configuration wherein the entire instruction was executed in substantially one machine cycle. Thus, microcode has enabled the cost of the central processing unit to be reduced, by reducing the required hardware; however, in trade, the time required to implement instructions increases. This trade-off occurs because the microcode program will typically sequence through plural microcode instructions for each machine instruction. On the other hand, the reduced cost and complexity of the hardware, in exchange for speed, has resulted in less expensive so-called mini- and superminicomputers which have attained a significant market share for applications in which the main frame computer cannot compete on a cost basis.

Today, as the performance gap between the low end main frame and the superminicomputers narrows, as a result of faster semiconductor technologies and improved VLSI techniques, there is a continuing pressure to both increase the speed, and hence throughput, of the superminicomputer while maintaining the manufacturing cost advantages typically associated with the machines using microcode. Furthermore, computer programming techniques for decimal and variable length string manipulation are often time consuming and, in effect, reduce throughput as the microcode sequence of instructions require substantial steps of data manipulation.

It is therefore an object of the present invention to both increase speed and hence throughput in a minicomputer or superminicomputer while maintaining the manufacturing cost below the comparable main frame equipment. Other objects of the invention are to provide high reliability, to reduce the number of microcode program steps required to implement variable length string and decimal instructions, to maintain the lower manufacturing costs typically associated with mini-and supermini data processing systems, and to simplify the microcode implementations required for decimal and variable length string manipulations.

SUMMARY OF THE INVENTION

The invention thus relates to a data processing system having a central processing unit (CPU) using an arithmetic unit for processing data in response to programmed machine instructions. The central processing unit further has a control store for storing microcode program instructions which responds to the machine instruction being decoded for generating a timed sequence of control store signals (microcode) for executing that instruction. An improved arithmetic unit features, according to a preferred embodiment of the invention, a reconfigurable arithmetic logic unit, a data string manipulation circuit for aligning data strings for processing by the reconfigurable arithmetic logic unit, and a control circuit which is responsive to a microcode independent machine state for generating control signals which are useful in configuring the arithmetic logic unit and for controlling the data string manipulation circuitry.

In another aspect of the invention, there is featured a method for performing string and digit manipulations in an arithmetic unit using the steps of aligning the data to be operated upon by the machine instruction so that the input data strings to the arithmetic logic unit of the arithmetic unit are in alignment, and responding to both microcode instructions and hardware generated, instruction responsive control signals for configuring the arithmetic logic unit into a desired structural state.

BRIEF DESCRIPTION OF THE DRAWINGS

Other objects, features, and advantages of the invention will appear from the following description of a preferred embodiment taken together with the drawings in which.

DESCRIPTION OF A PREFERRED EMBODIMENT

Figure 1:
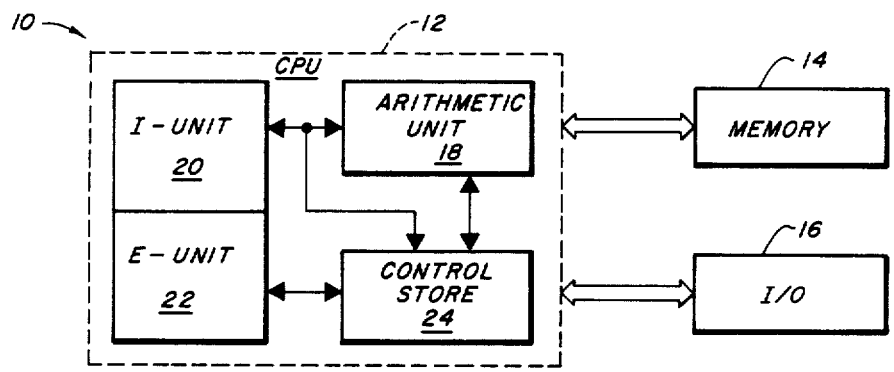
FIG. 1 is a block diagram of a typical computer system in which the invention can be employed.

Referring to FIG. 1, a typical data processing system 10 has a central processing unit 12, a storage memory 14, and an input/output circuitry 16. Typically, the central processing unit includes an arithmetic unit 18, an instruction unit 20 for fetching and decoding a machine instruction, an execution unit 22 for executing the decoded instruction, and, for a minicomputer system, a control store 24 which provides the microcode program steps for implementing the execution of instructions for the apparatus. These units generally communicate with each other and further the hardware distinction between the units is not always clear. This is illustrated in FIG. 1, for example, where the instruction unit and the execution unit share a common boundary.

The present invention is directed toward improving the throughput of the central processing unit by providing a more flexible and faster arithmetic unit. The improved arithmetic unit necessarily changes the composition of the microcode program stored in control store 24. In particular, according to the invention, the number of steps required for implementing various of the instructions decoded by the instruction unit 20 can be reduced. The changes required in the microcode program, in the instruction unit, and in other portions of the CPU, will be apparent to those practiced in the computer arts and only the focus of the invention, the arithmetic unit, will be described in substantial detail herein.

Figure 2:
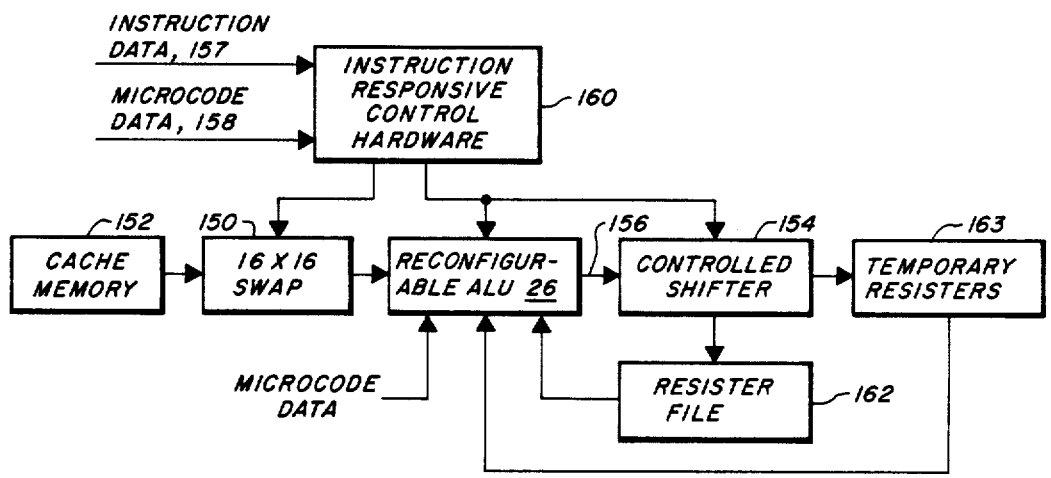
FIG. 2 is an electrical block diagram of the arithmetic unit arranged in accordance with the invention.
Figure 3:
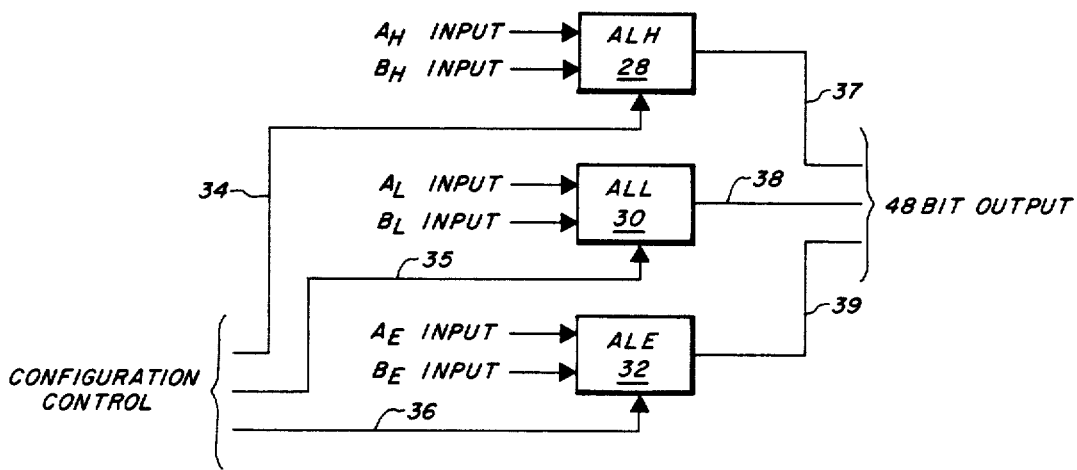
FIG. 3 is an elementary block diagram of the reconfigurable arithmetic logic unit (ALU) in accordance with the invention.

Referring to FIG. 2, the arithmetic unit 18 is structured around a reconfigurable arithmetic logic unit 26. The arithmetic logic unit 26, shown in more detail in FIG. 3, has three basic components, a high arithmetic logic unit (ALH) 28, a low arithmetic logic unit (ALL) 30, and an extended arithmetic logic unit (ALE) 32. Each of the arithmetic logic units 28, 30, and 32 can process sixteen input bits on the A and B inputs respectively and each unit operates under the control of a separate configuration control signal over lines 34, 35, and 36 respectively. The arithmetic logic units 28, 30, and 32 each produce a sixteen-bit output over lines 37, 38, and 39 respectively. As described in detail below, each of the arithmetic logic units 28, 30, and 32 has a different internal control configuration for providing flexibility for the apparatus.

Figure 4:
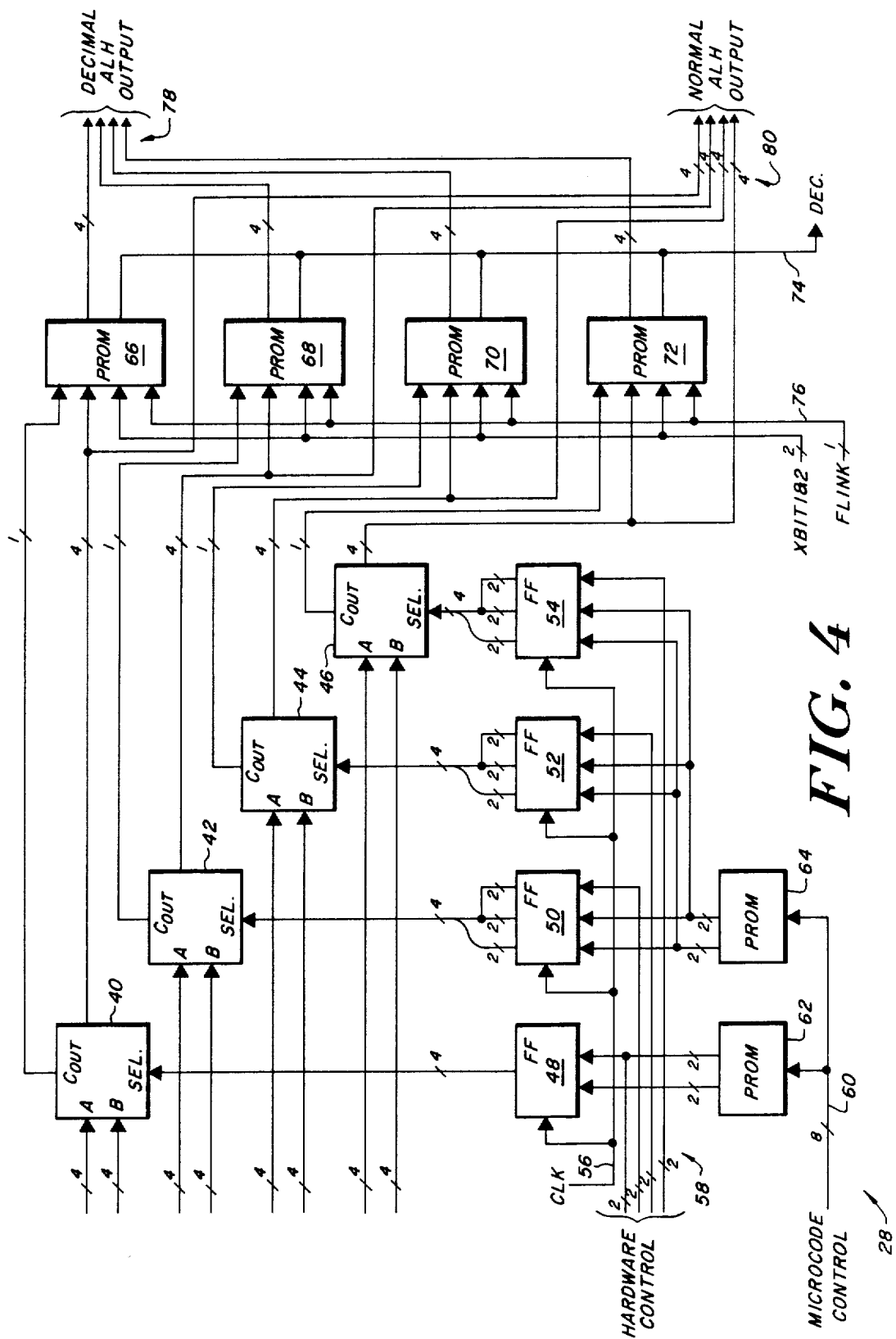
FIG. 4 is a more detailed block diagram of the high arithmetic logic unit (ALH) in accordance with the invention.

Referring now to FIG. 4, the high arithmetic logic unit 28 has four, four-bit ALU's 40, 42, 44, and 46 which can be for example Motorola Type 10181. Each four-bit ALU operates independently of the other four-bit ALU's and has separate four-bit A and B inputs and provides a four bit output. Each four-bit ALU is controlled by the four-bit input signal at its select input. Typical operations can be, for example, transfer A, transfer B, AND, OR, EXCLUSIVE OR, NOT A, NOT B, . . . , as is well known for an arithmetic logic unit. What is important in this configuration is that each of the four-bit ALU's 40, 42, 44, and 46 can be and is separately controlled by the outputs of clocked storage flipflops 48, 50, 52, and 54 respectively. The clock for flipflops 48, 50, 52, and 54 is available over a line 56. The inputs to the flip-flops come from both a hardware control source over lines 58 and a microcode control source over lines 60 to programmable read-only memories (PROM's) 62 and 64. The PROM's are preprogrammed in accordance with the arithmetic operations to be performed by the arithmetic logic units 40, 42, 44, and 46.

In the illustrated embodiment, flip-flop storage element 48 comprises four flip-flops with the input of one pair of flip-flops being taken as a wired OR from the hardware control and the output of PROM 62. In accordance with the illustrated embodiment of the invention, flip-flops 50, 52, and 54 are all controlled using the same control signal from the microcode source, and hence each receives the same output from PROM 64. However, the hardware control for each of these flip-flops is separate; and therefore, each of flip-flops 50, 52, and 54 must contain six storage flip-flops, the outputs of two pairs of which are wire OR'ed together, as shown, at the output of the flip-flop. In this manner proper (and independent) control of the arithmetic units 42, 44, and 46 can be maintained.

The high ALU 28 operates both to provide decimal arithmetic as well as "a normal ALU output." Thus, PROM's 66, 68, 70, and 72 are provided to implement a "6666 conversion" as is well known in the art for converting the binary output of the arithmetic logic units to a decimal output. While the look ahead carries for this ALU are not shown herein, that structure is well known to those practiced in the computer arts. Also shown in connection with PROM's 66, 68, 70, and 72 is the zero detect implementation which uses the wire OR'ed output signal over line 74 to determine whether any output is non-zero. The input line over line 76 represents the history of the present ALU decimal operation and acts to store and retain the information representing whether one of the outputs was non-zero during a previous decimal arithmetic step. The XBIT1+2 signals represent the number of decimal digits participating in a decimal add or subtract. The result of the "6666 conversion" is that a decimal ALH output can be obtained over lines 78, according to one mode of ALH operation; while a normal binary ALH output can be obtained over lines 80 in other modes of ALH operation.

Figure 5:
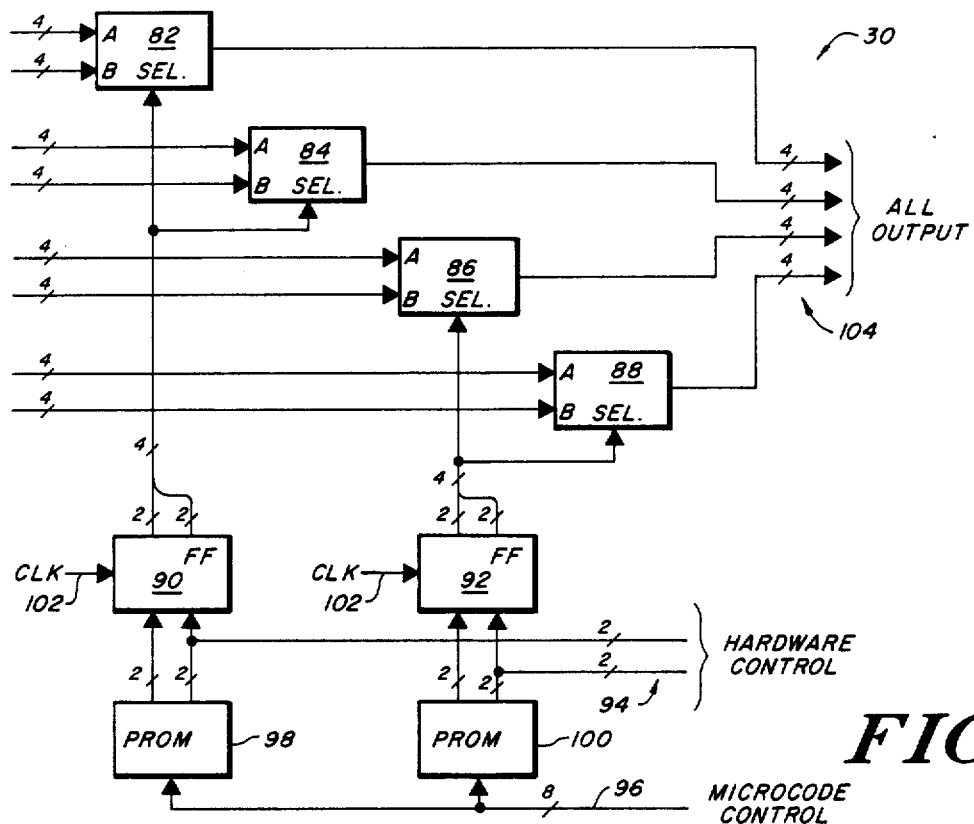
FIG. 5 is a more detailed block diagram of the lower arithmetic logic unit (ALL) in accordance with the invention.

Referring now to FIG. 5, the lower arithmetic logic unit 30 also has four four-bit arithmetic logic units 82, 84, 86, and 88. In ALL 30, arithmetic logic units 82 and 84 are paired together and controlled by the outputs of a flip-flop storage element 90. Similarly arithmetic logic units 86 and 88 are paired together and are controlled by the outputs of a flip-flop storge element 92. The inputs to flip-flops 90 and 92 come from both hardware and microcode over lines 94 and 96 respectively. The microcode control signals drive PROM's 98 and 100. The outputs of PROM's 98 and 100 are in part wire OR'ed to the hardware control signals over lines 94 for storage in the flip-flop storage elements 90 and 92 by clock signals over a clock line 102. The outputs of the ALU's 82, 84, 86, and 88 are available directly as a sixteen-bit ALL output over lines 104.

Figure 6:
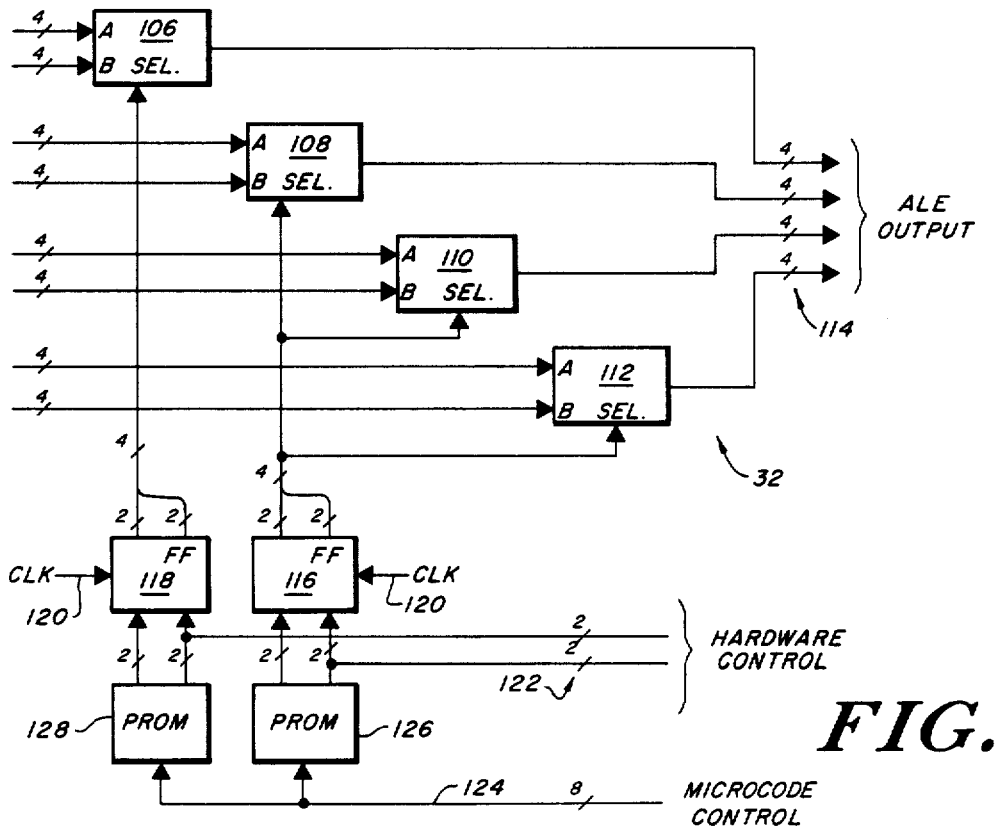
FIG. 6 is a more detailed block diagram of the extended arithmetic logic unit (ALE) in accordance with the invention.

Referring now to FIG. 6, the extended ALU 32, like the ALH and ALL, has four four-bit ALU's 106, 108, 110, and 112. Each of these four-bit ALU's receives four-bit A and B inputs and together provide the sixteen-bit ALE output over lines 114. In the illustrated embodiment of the invention, ALU 106 is controlled separately from ALU's 108, 110, and 112 which are each controlled by identical control signals from the outputs of a clocked flip-flop storage element 116. A clocked flip-flop storage element 118 controls, through its outputs, the operation of ALU 106. The flip-flop storage elements 116 and 118 are clocked over a clock line 120. The inputs to flip-flop storage elements 116 and 118 are derived from hardware control inputs over lines 122 and microcode control inputs over lines 124 to PROM's 126 and 128. The four-bit output of the PROM's 126 and 128 are directed to flip-flop storage elements 116 and 118 respectively. Two of the output lines for each PROM are wire OR'ed to corresponding lines from the hardware control source.

Figures 7, 8:
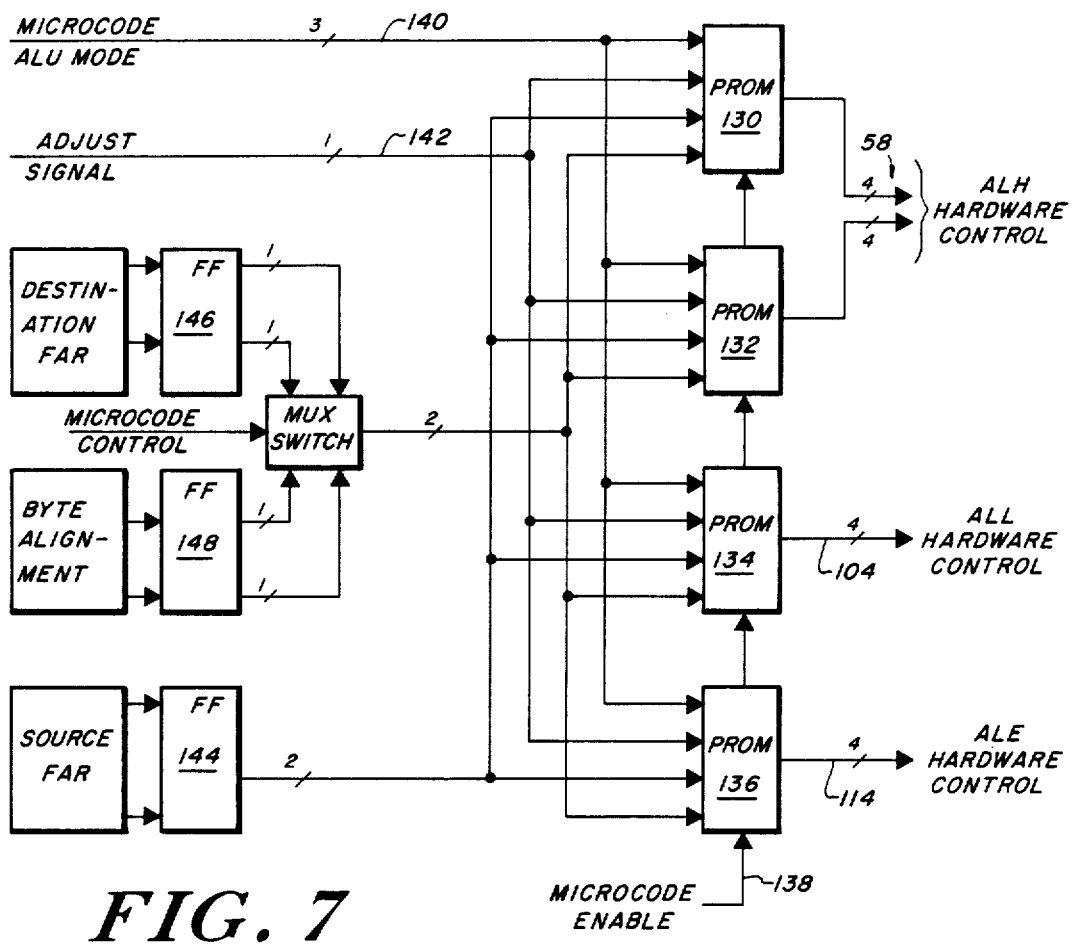
FIG. 7 is an electrical block diagram of the preferred circuitry for generating the hardware control signals for controlling the arithmetic logic unit and string manipulation circuitry according to the invention.
FIG. 8 is the result of a sequence of word boundary manipulations which illustrate one specific example of data manipulation according to the invention.

Referring to FIG. 7, the hardware control signals to the ALH 28, ALL 30, and ALE 32 are the outputs of PROM'130, 132, 134, and 136. The ALH hardware control signals are available over lines 58 from PROM's 130 and 132; the ALL hardware control signals over lines 104 are available from PROM 134; and the ALE hardware control signals over lines 114 are available from PROM 136. The output hardware control signals are enabled from a microcode enable signal available to each of the PROM's 130, 132, 134, and 136, over a line 138. Each of PROM's 130, 132, 134, and 136 receive the same four inputs. Each PROM has inputs from the microcode instruction which defines the ALU mode of operation by a three-bit signal; an adjust signal over a line 142 from a source which defines a floating point operation; and position signals from the instruction decoding and machine state hardware, and in particular from the lower two bits of the source and destination field address register stored in flip-flop elements 144 and 146 respectively, and the ending byte alignment stored in flip-flops 148. The corresponding outputs of flip-flops 146 and 148 are multiplexed under microcode control and then provided to the PROM's. The output of flip-flops 144 are applied directly to the PROM's.

The hardware control signal generation circuitry of FIG. 7 is designed to provide hardware control signals in all but one microcode mode of operation. That mode of operation, the floating point mode of arithmetic operation, does not typically use the hardware control signals from the hardware of FIG. 7. However, in order to adjust the exponent in the floating point mode of operation, the adjust signal over line 142 is employed and the FIG. 7 hardware operates to adjust the exponent of the two numbers to be added or subtracted (based upon the exponent value difference found during a first microcode step) so that their exponents will be the same.

The instruction decoding hardware, not shown, the results of which are stored and manipulated in the flip-flop elements 144, 146, and 148, are designed to provide information to PROM's 130, 132, 134, and 136 regarding the byte difference in lengths of the source and destination strings and the difference in alignments of the two strings' locations. With this information, the PROM's are capable of providing the necessary ALH, ALL, and ALE hardware control signals in response to the particular microcode instructions being employed for configuring the ALU 26 to properly handle the string mask/merge operations.

Referring again to FIG. 2, the reconfigurable arithmetic logic unit 26 operates in combination with data manipulation hardware for processing strings of decimal digits and text material. The data manipulation hardware includes a sixteen by sixteen swapping circuitry 150 which swaps the two sixteen-bit data blocks making up a thirty-two-bit word read from a cache memory 152. The data manipulation hardware also includes a controlled shifting circuit 154 which can act upon an input from the reconfigurable ALU over lines 156 for effecting either a right byte rotation on a thirty-two-bit input, a right nibble rotation on a sixteen-bit input (decimal), a forty-eight-bit floating point hardware adjustment, or a null instruction wherein the input is passed through unaffected. The control signals for the shifting circuitry 154 are derived from the instruction data over lines 157 and microcode data over lines 158 by an instruction responsive control hardware 160. This hardware corresponds to that described hereinbefore in connection with FIG. 7. The control hardware 160 also provides the controlling signals for operating the sixteen by sixteen swapping circuitry 150 and, in combination with microcode derived signals, the reconfigurable ALU 26. The output of the controlled shifting circuitry 154 can be stored in a register file 162 or in temporary hardware registers 163. The register file is a collection of storage registers available for general use. The output of the register file is made available to the reconfigurable ALU 26, over the A input in the illustrated embodiment, for processing in accordance with the string manipulation and decimal instructions. In the illustrated embodiment the temporary registers can connect to the B input.

Referring now to FIG. 8, an example of a typical string operation using the reconfigurable arithmetic logic unit in combination with the data manipulation hardware enables shifting and manipulation of string and decimal data. In particular, as shown in line (a) of FIG. 8, a nine-character source input string begins at the first byte of a source word 170 and is to be moved to a destination location as shown in line (b). At the destination, the asterisks represent data which is not to be changed and which already exists at the destination location.

The first step places the first word of the destination location in a storage register of the register file. This can be effected by placing the reconfigurable ALU in a do nothing or pass through mode, reading the data from cache memory, and passing it through the swapping circuitry 150, the ALU 26, and the control shifting circuitry 154, to the register file 162. Thereafter, the first word of the source data is read, rotated one byte position to the right by the controlled shifting circuitry 154 and stored in a temporary register in the storage 163. The result of the right shift is illustrated in line (d) of FIG. 8. The bytes of data illustrated in lines (c) and (d) are then merged by applying the data in line (c) to the A input of the reconfigurable ALU, applying the input data in the temporary register to the B input of the reconfigurable ALU, and configuring the ALU 26 to transport the high eight bits of the A input of the high ALU, the low eight bits of the B input of ALH, and the B input of ALL. This configuration provides the output illustrated in line (e) of FIG. 8. The line (e) output is stored as the first word at the destination.

The ALU is then reconfigured to transport the second source word from memory to the controlled shifting circuitry which again performs a one-byte rotation to the right. The result is stored in a register of register file 162 and is illustrated at line (f). Again a merge is performed by configuring the reconfigurable ALU to transport the B input for the upper half of ALH (the B input being the data on line (d)) and the A input for the remainder of ALH and all of ALL (the A input being the data on line (f)). The result, illustrated in line (g), is stored as the second word at the destination.

The next thirty-two-bit word from the cache memory is then read from the source location, passed through the reconfigurable ALU 26, rotated one byte to the right by controlled shifter 154, and stored in the temporary storage 163. The result is illustrated at line (h). The contents of the register file corresponding to lines (f) and temporary storage corresponding to line (h) are merged by the reconfigurable ALU 26 in the manner noted above and the result passes through shifter 154 and is stored in the register file 162 (see line (i) of FIG. 8). Next, the content of the destination word corresponding to the third word of line (b) is read (and appears at the B input to the ALU 26) and is mask/merged with the contents of the register file illustrated in line (i). In this case, the word from the destination memory location line (j) is available at the B input to the reconfigurable ALU and the content of the register file corresponding to line (i) is available at the B input to the ALU 26. The ALU is configured, in accordance with this aspect of the example, so that ALH transports the data available at its A inputs while ALL transports the data available at its B inputs. The result is stored in memory and is illustrated at line (k).

In the example above, several different operations were performed which are common to many string manipulations. In the formation of the first destination word (line (e)), there was a first read from the destination location to obtain the destination word because a portion of that word appears after merging the data. This can be referred to as the read-modify-write for the first destination word. In other circumstances it may be necessary to read an extra word from the source data where two source words are being combined to form the first destination word. The straightforward formation of the destination word of line (g) represents what might be called the "fast mode" of operation wherein the extra step of, for example, line (c) or line (j) need not be taken. In the fast mode of operation only three steps are needed for forming each destination word. Thus, the apparatus is capable of reconfiguring the ALU 26 to flexibly accommodate any string manipulation or decimal calculation. The byte or nibble manipulations, which are required by the machine instruction sets, are easily accommodated.

In particular, the ALH provides a full capability of performing nibble (four-bit) arithmetic operations as are commonly used for decimal manipulations. The ALH and the ALL can both be configured in a byte mode for performing string manipulations, and the ALH, ALL, and ALE are capable of floating point arithmetic. In other embodiments, however, the arithmetic unit 26 can be configured in any desirable mode and indeed the particular configurations shown in the illustrated embodiment, while desirable for the particular apparatus shown there, can be changed to suit the needs of the apparatus. What is important is that the number of microcode program steps is reduced by the inclusion of the combination of the reconfigurable ALU and the instruction responsive control hardware which operates directly from the decoded instruction data. Further, it is important that the control hardware operates without reference to, but still under control of the microcode. This results in a significant increase in throughput without incurring substantial hardware costs.

Additions, subtractions, deletions, and other modifications of the disclosed preferred embodiment of the invention will be obvious to those practiced in the art and are within the scope of the following claims.

What is claimed is:

1. In a data processing system having
   a central processing unit having an arithmetic unit for processing data in response to programmed machine instructions, and
   a control store for storing microcode program instructions and responsive to a said machine instruction for implementing said machine instruction, the improvement comprising
   a reconfigurable primary arithmetic logic unit, including a plurality of individually controlled secondary arithmetic logic units connected in a parallel arrangement for handling input groups of data,
   a data string manipulation circuitry for aligning data strings for processing by the primary arithmetic logic unit, and
   circuitry responsive to a microcode independent machine state for generating separate secondary arithmetic logic unit control signals for separately internally reconfiguring each said secondary arithmetic logic unit and for controlling said data string manipulation circuitry.

2. In a data processing system having a central processing unit having an arithmetic unit for processing data in response to programmed machine instructions, and
   a control store for storing microcode program instructions and responsive to a said machine instruction for implementing said machine instruction, the improvement comprising
   a reconfigurable primary arithmetic logic unit, said reconfigurable arithmetic logic unit including
     a first individually controlled reconfigurable arithmetic logic unit,
     a second individually controlled reconfigurable arithmetic logic unit, and
     a third individually controlled reconfigurable arithmetic logic unit,
   said first, second and third reconfigurable arithmetic logic units being connected in a parallel arrangement for handling input group of data, each said first, second and third reconfigurable arithmetic logic units comprising a plurality of individually controlled arithmetic logic units connected in a parallel arrangement for handling input groups of data,
   a data string manipulation circuitry for aligning data strings for processing by the primary arithmetic logic unit, and
   circuit means repsonsive to a microcode independent machine state for generating primary arithmetic logic unit control signals for internally reconfiguring said primary arithmetic logic unit and data string manipulation circuitry control signals for controlling said data string manipulation circuitry.

3. The data processing system of claim 2
   wherein said first reconfigurable arithmetic logic unit has means for operating in a nibble mode, a byte mode, and a double byte mode, and
   wherein each controlled arithmetic logic unit of said first arithmetic logic unit has associated therewith means for controlling its mode of operation independently of the mode of operation of any other controlled arithmetic logic unit.

4. The data processing system of claim 3
   wherein said second arithmetic logic unit has means for operating in a byte mode of operation and a double byte mode of operation, and
   wherein in said byte mode of operation, said means can operate each pair of controlled arithmetic logic units independently of any other pair of controlled arithmetic logic units.

5. The data processing system of claim 4 further wherein said third arithmetic logic unit comprises
   means for configuring said arithmetic logic unit for operating in either a split nibble/three nibble mode of operation or a double byte mode of operation, and
   wherein, in said nibble/three nibble mode of operation the decoded instruction circuit means comprises
     means responsive to a microcode instruction from the control store for modifying the control signals of said circuit means for varying the configuration of said arithmetic logic unit.

6. In a data processing system having a central processing unit having an arithmetic unit for processing data in response to programmed machine instructions, and a control store for storing microcode program instructions and responsive to a said machine instruction for implementing said machine instruction, the improvement comprising a reconfigurable primary arithmetic logic unit, including a plurality of individually controlled arithmetic logic units connected in a parallel arrangement for handling input groups of data, a data string manipulation circuitry for aligning data string for processing by the primary arithmetic logic unit, circuitry responsive to a microcode independent machine state for generating primary arithmetic logic unit control signals for internally reconfiguring said primary arithmetic logic unit and data string manipulation circuitry control signals for controlling said data string manipulation circuitry, and circuitry responsive to said microcode instruction for at least partially inhibiting said circuit means from responding to said machine state and for generating said control signals at least in part from said microcode instructions.

7. In a data processing system having a central processing unit having an arithmetic unit for processing data in response to programmed machine instructions, and a control store for storing microcode program instructions and responsive to a said machine instruction for implementing said machine instruction, the improvement comprising a reconfigurable primary arithmetic logic unit having, a first reconfigurable arithmetic logic unit, a second reconfigurable arithmetic logic unit, and a third reconfigurable arithmetic logic unit, each said first, second, and third reconfigurable arithmetic logic unit comprising a plurality of individually controlled arithmetic logic units connected in a parallel arrangement for handling input groups of data, a data string manipulation circuitry for aligning data strings for processing by said primary arithmetic logic unit, circuit means responsive to a microcode independent machine state for generating primary arithmetic logic unit control signals for internally reconfiguring said primary arithmetic logic unit and data string manipulation circuitry control signals for controlling said data string manipulation circuitry, and circuitry responsive to said microcode instruction for at least partially inhibiting said circuit means from responding to said machine state and for generating said control signals at least in part from said microcode instructions.

8. In a data processing system having a central processing unit employing a primary arithmetic logic unit including plural secondary arithmetic logic units for processing data in response to programmed machine isntructions, and a control store for microcode program storage responsive to a said instruction for implementing said instruction, a method for performing string and digit manipulations in said primary arithmetic logic unit comprising the steps of aligning the data to be operated upon by said instruction so that the input data strings to said primary arithmetic logic unit are aligned, and responding to microcode independent, instruction responsive control signals for separately internally reconfiguring each of said secondary arithmetic logic units.

9. The method of claim 8 further comprising the step of aligning said data in response to hardware generated, instruction responsive, data signals.

* * * * *